(12) United States Patent
Lin

(10) Patent No.: US 7,029,016 B2
(45) Date of Patent: Apr. 18, 2006

(54) SHOCK ABSORBING STRUCTURE OF TURNING MECHANISM OF AN ELECTRIC CART EQUIPPED WITH TWIN FRONT WHEELS

(75) Inventor: Samuel Lin, Chia Yi (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 394 days.

(21) Appl. No.: 10/662,291

(22) Filed: Sep. 16, 2003

(65) Prior Publication Data

US 2005/0057032 A1    Mar. 17, 2005

(51) Int. Cl.
 *B62D 7/06* (2006.01)

(52) U.S. Cl. ............................................. 280/93.502
(58) Field of Classification Search ................ 280/779, 280/93.505, 93.502, 93.51, 124.109
See application file for complete search history.

(56) References Cited

U.S. PATENT DOCUMENTS 6,142,494 A * 11/2000 Higuchi .................. 280/93.51
6,375,205 B1 * 4/2002 De Fontenay et al. .. 280/93.502

* cited by examiner

*Primary Examiner*—Faye M. Fleming
(74) *Attorney, Agent, or Firm*—Rosenberg, Klein & Lee

(57) ABSTRACT

A turning mechanism of an electric cart includes twin front wheels, a control shaft, and an axle; the shaft has a horizontal rod portion at a lower end; the front wheels are connected to two ends of the axle while the axle is arranged under the horizontal rod portion; the front wheels are much closer to each other than rear wheels are to each other; springs are located between the axle and the horizontal rod portion; connecting plates are arranged next to fronts and rears of the horizontal rod portion and the axle, and each has two fitting holes respectively opposing a through hole of the horizontal rod portion, and a through hole of the axle; ringed pads are inserted in respective fitting holes, and bolts are inserted through the ringed pads, and the through holes; thus, the cart is like a three-wheel one in terms of easiness to use and simplicity of the structure.

4 Claims, 9 Drawing Sheets

SHOCK ABSORBING STRUCTURE OF TURNING MECHANISM OF AN ELECTRIC CART EQUIPPED WITH TWIN FRONT WHEELS

BACKGROUND OF THE INVENTION

1. Field of the Invention

The present invention relates to a turning mechanism of an electric cart equipped with twin front wheels, more particularly one, which are provided with an axle, a control shaft, and elastic elements disposed between the axle and a lower horizontal rod portion of the control shaft such that shock of the electric cart can be absorbed when the electric cart is used.

2. Brief Description of the Prior Art

Referring to FIG. 9, a conventional electric cart 2 includes a frame 21, a chair 22 disposed on a rear end of the frame 21, a holding tube 25 projecting from a front end of the frame 21, a control shaft (not numbered) inserted through and supported by the holding tube 25, handlebars 23 coupled to an upper end of the control shaft, a front wheel 26 connected to a lower end of the control shaft, and two rear wheels 24 arranged at rear corners of the frame 21. This three-wheel cart has a disadvantage that it is prone to fall over when it tilts too much in turning.

Therefore, four-wheel electric carts are provided to overcome the above disadvantage, which are equipped with two front wheels instead; the distance between both front wheels is the same as that between both rear wheels. Front wheels of one such four-wheel electric cart have to be arranged at slightly different angles according to Ackeman Principle such that all the wheels can roll around a common point for allowing the cart to move smoothly when the cart is turning. Consequently, a turning mechanism of one such four-wheel electric cart will have a more complicated structure, and the manufacturing cost and weight of the cart will increase. Therefore, such four-wheel electric carts are not ideal. Moreover, some countries impose relatively strict regulations on the manufacturing and sale of such four-wheel electric carts.

SUMMARY OF THE INVENTION

It is a main object of the present invention to provide a turning mechanism of an electric cart to overcome the above disadvantages.

The present turning mechanism is equipped with twin front wheels, a control shaft, and an axle. The shaft has a horizontal rod portion at a lower end. The front wheels are connected to two ends of the axle while the axle is arranged under the horizontal rod portion. The front wheels are much closer to each other than both rear wheels are to each other. Elastic elements are located between the axle and the horizontal rod portion while connecting plates are arranged next to front and rear sides of the horizontal rod portion and the axle. Each connecting plate has two fitting holes respectively opposing a through hole of the horizontal rod portion, and a through hole of the axle. Ringed pads are inserted in respective fitting holes, and bolts are inserted through the ringed pads, and the through holes. Thus, the present electric cart is like a four-wheel one in terms of stability, and is like a three-wheel one in terms of easiness to use and simplicity of the structure.

BRIEF DESCRIPTION OF THE DRAWINGS

This invention will be better understood by referring to the accompanying drawings, wherein.

DETAILED DESCRIPTION OF THE PREFERRED EMBODIMENTS

Figure 1:
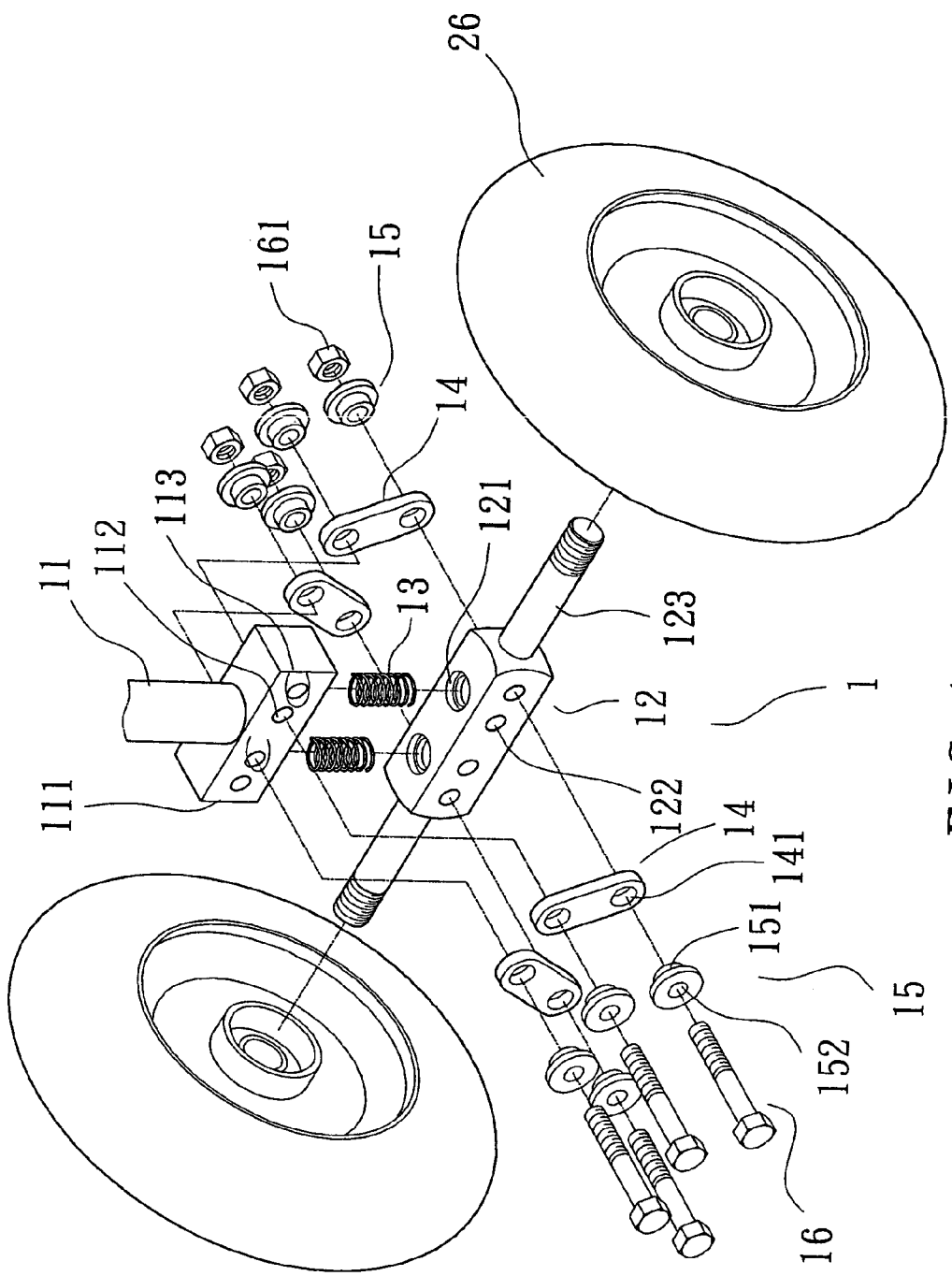
FIG. 1 is an exploded perspective view of the twin front wheels of an electric cart according to the present invention.

Referring to FIG. 1, a preferred embodiment of an electric cart in the present invention is equipped with a turning mechanism 1, which includes a control shaft 11, an axle 12, elastic elements 13, connecting plates 14, ringed pads 15, bolts 16, and two front wheels 26.

Figure 2:
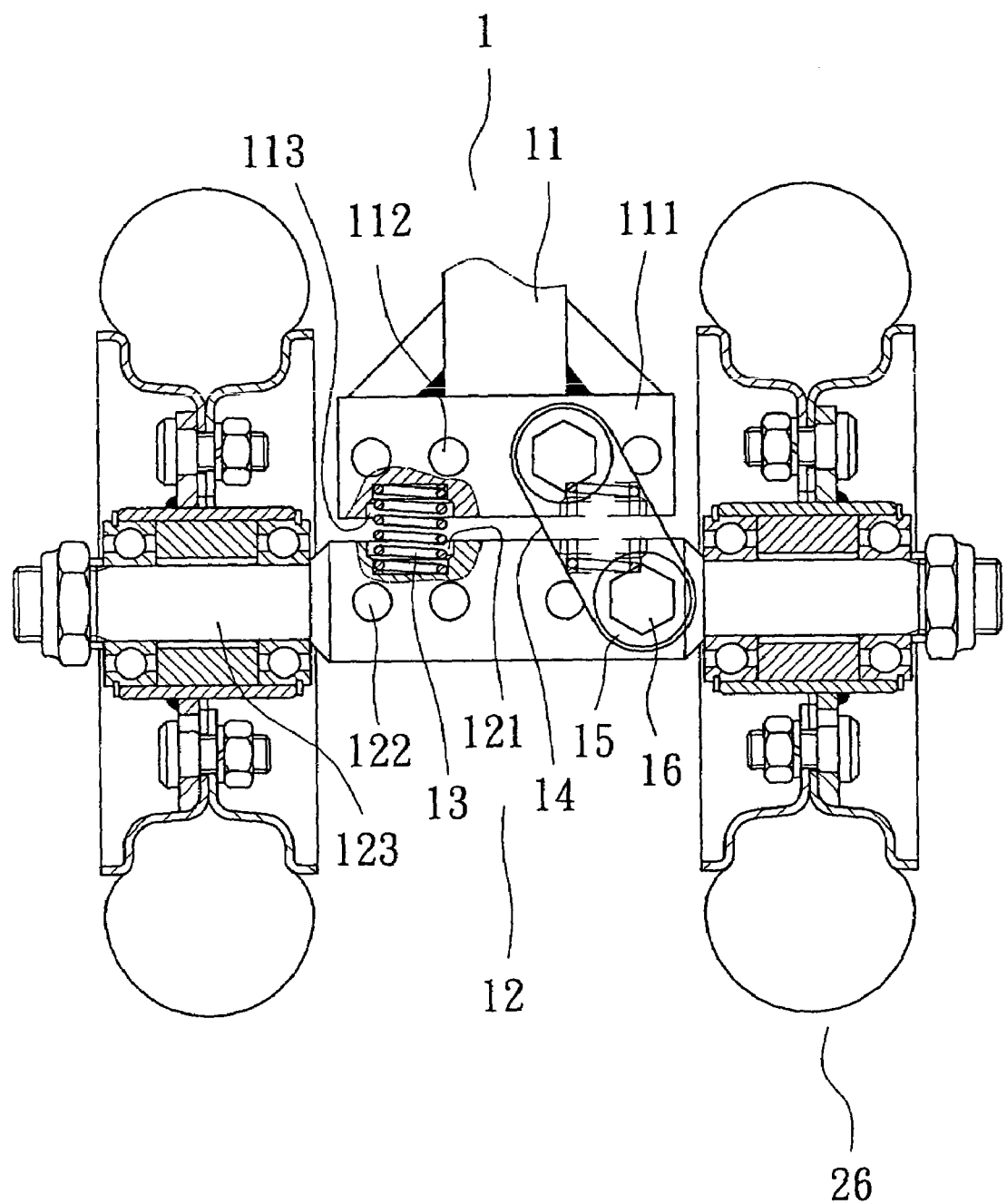
FIG. 2 is a front view of the twin front wheels of an electric cart according to the present invention.
Figure 3:
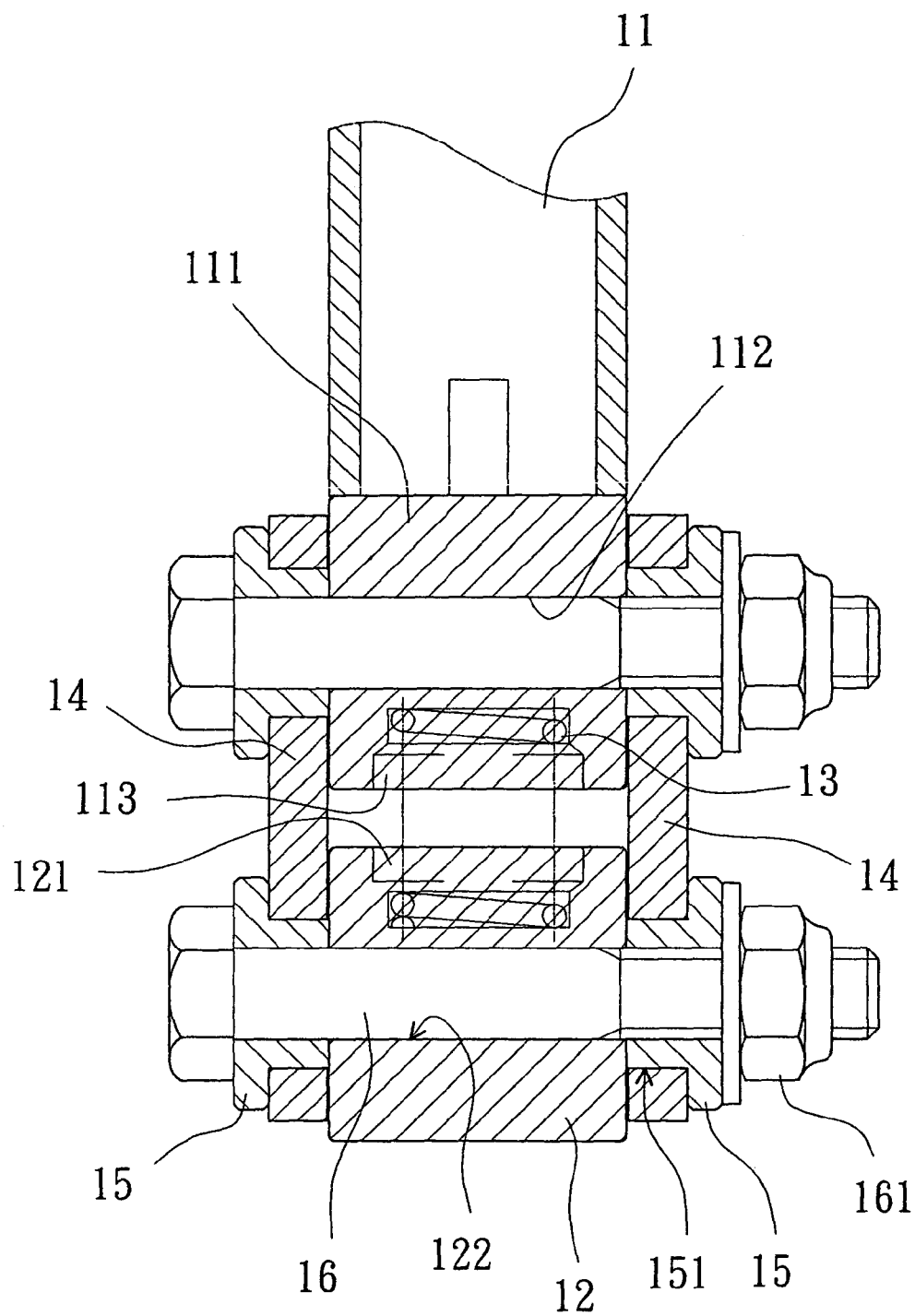
FIG. 3 is a partial view of the twin front wheels of an electric cart according to the present invention.

Referring to FIGS. 1 to 3, the control shaft 11 is inserted in a holding tube 25 projecting upwards from a front end of a frame 21 of the electric cart, and is connected with the front wheels 26 at a lower end, and handlebars 23 at an upper end. The control shaft 11 has a horizontal rod portion 111 at the lower end, which is formed with several through holes 112 extending from a front side to a rear side thereof, and hollows 113 on a lower side.

The axle 12 is formed with several through holes 122 extending from a front side to a rear side of a middle portion thereof, and hollows 121 on an upper side.

Each of the connecting plates 14 has fitting holes 141 at two ends. The ringed pads 15 are made of self-lubricating materials. Each of the ringed pads 15 has a pad portion, an insertion portion 151 having a smaller diameter than the pad portion, and a central hole 152 extending through both the pad portion and the insertion portion 151. In addition, the length of the insertion portions 151 is larger than the thickness of the connecting plates 14.

The axle 12 is connected to the front wheels 26 at two ends 123 thereof, and is formed with such a length that the front wheels 26 are much closer to each other than both rear wheels are to each other. The axle 12 is positioned under the horizontal rod portion 111 with the elastic elements 13 being respectively located in the hollows 113, and 121 at two ends thereof. The connecting plates 14 are arranged next to both the middle portion of the axle 12 and the horizontal rod portion 111 of the control shaft 11 such that lower ones of the fitting holes 141 thereof oppose selected ones of the through holes 122 of the axle 12, and such that upper ones of the fitting holes 141 oppose selected ones of the through holes 112 of the horizontal rod portion 111. The ringed pads 15 are respectively inserted in the fitting holes 141 of the connecting plates 14 at the insertion portions 151 thereof.

Figure 4:
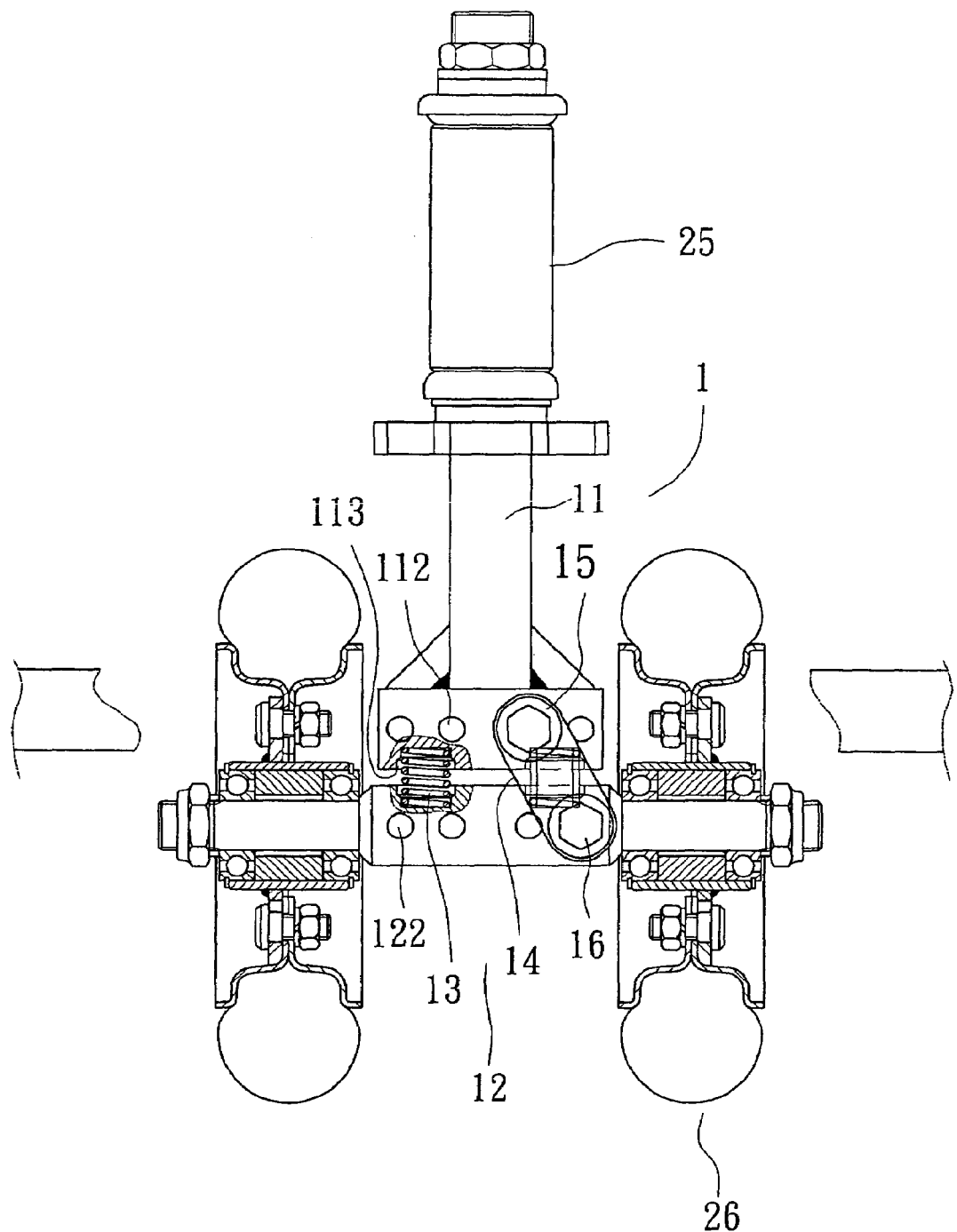
FIG. 4 is a view showing the connection of the present twin front wheels with the control shaft.
Figure 5:
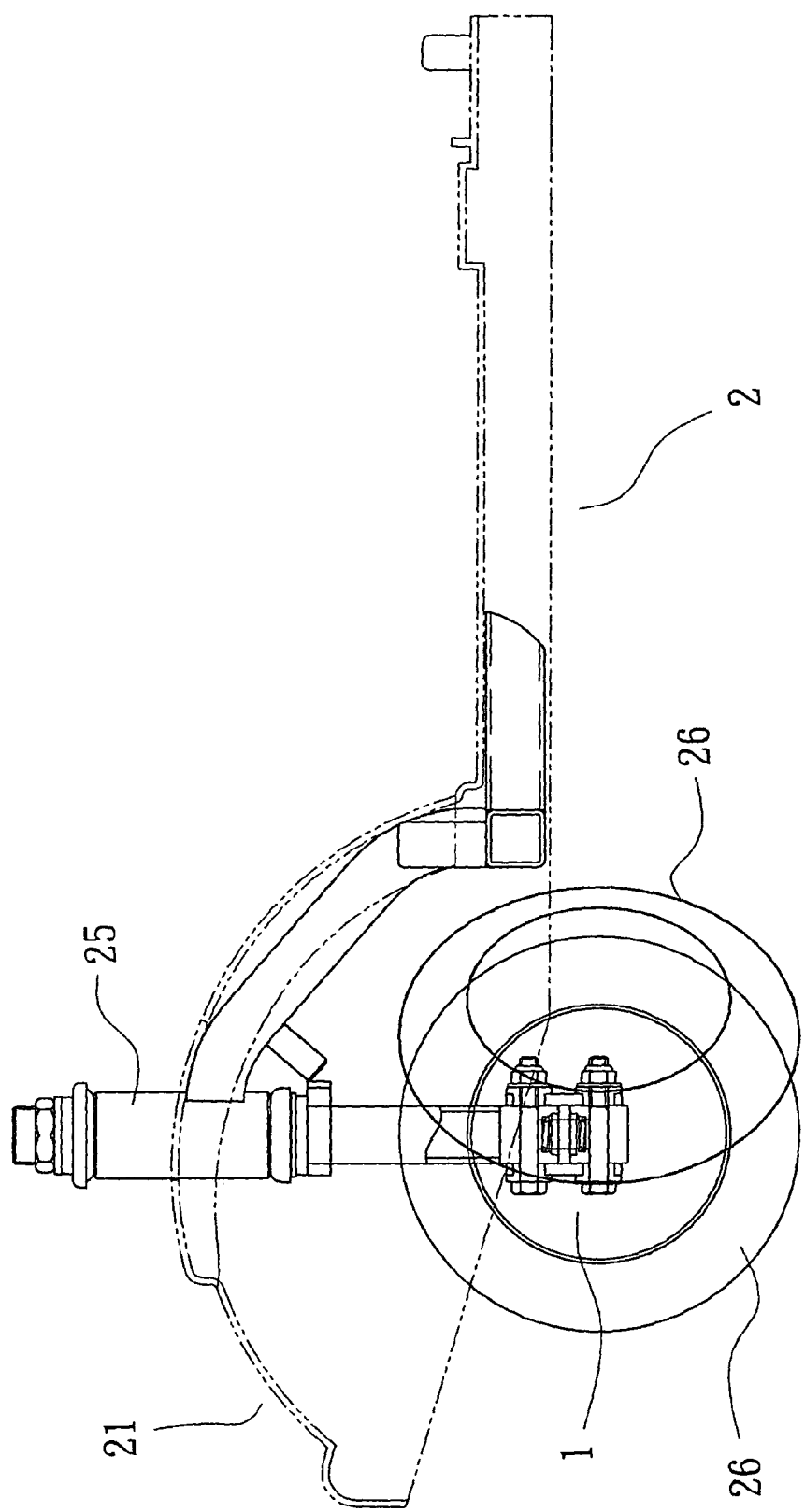
FIG. 5 is a partial side view of the electric cart according to the present invention.
Figure 6:
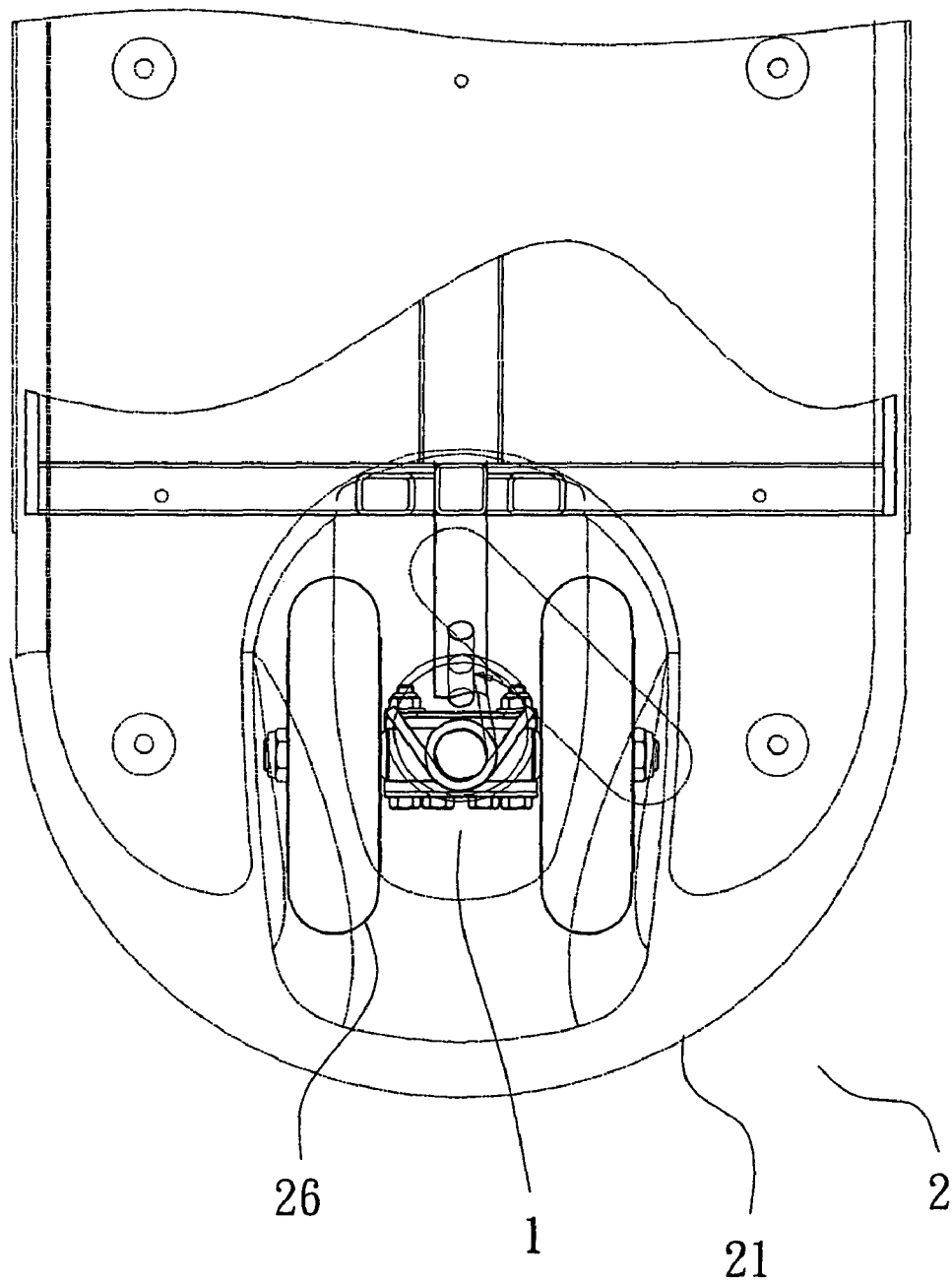
FIG. 6 is a partial vertical view of the electric cart according to the present invention.
Figure 8:
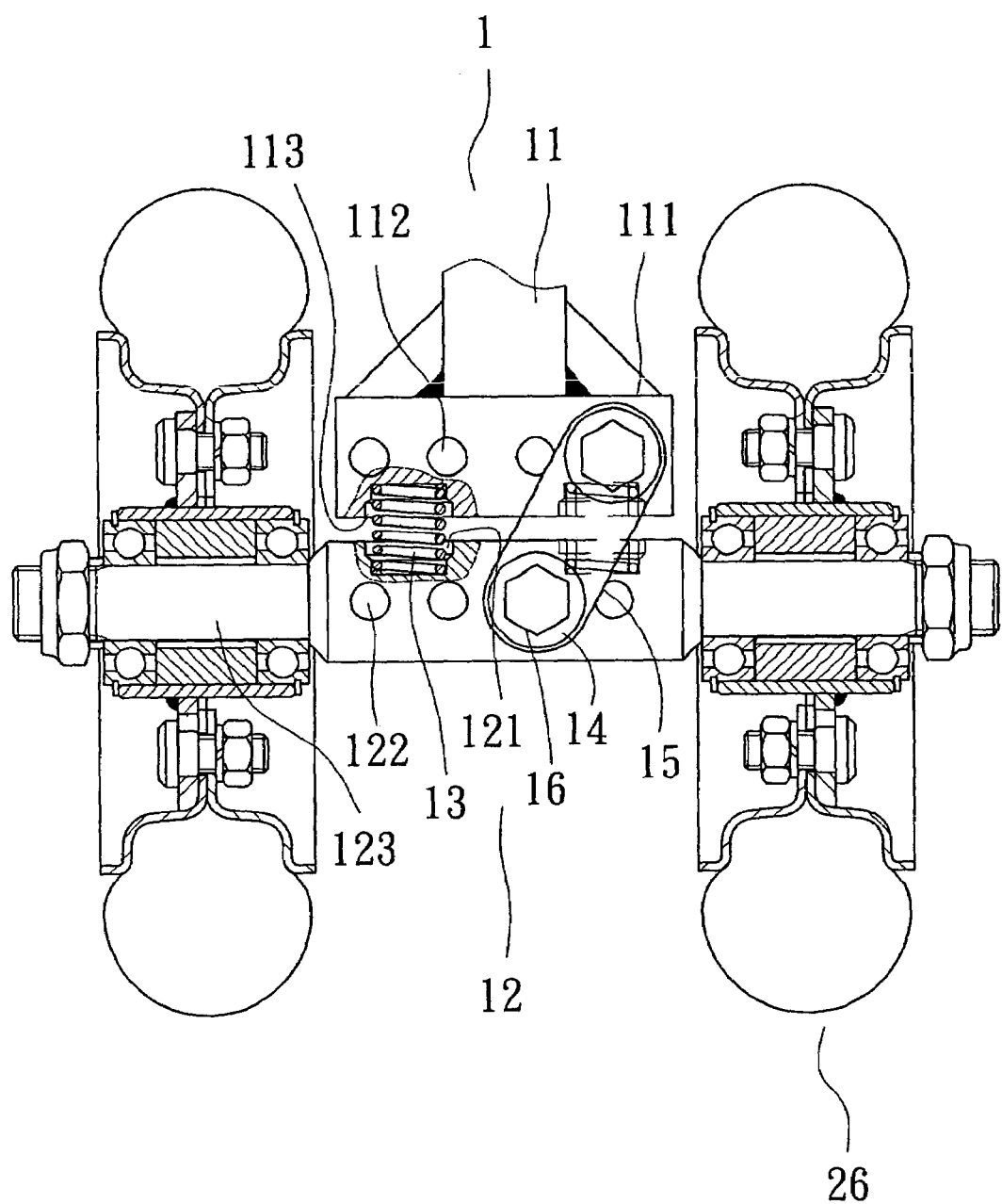
FIG. 8 is a front view of a second embodiment of twin front wheels of an electric cart.
Figure 9:
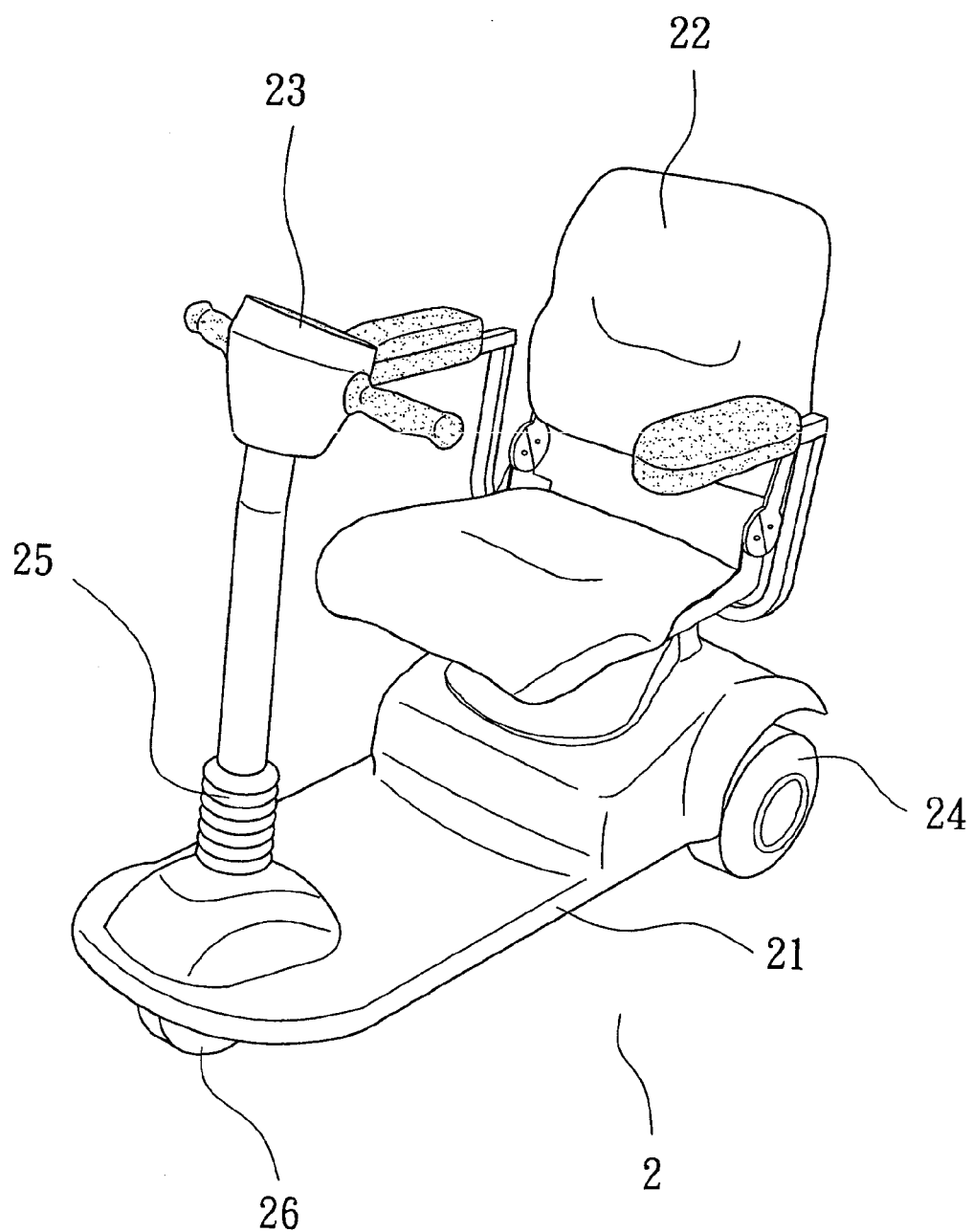
FIG. 9 is a perspective view of the conventional electric cart as described in the Background.

And, the axle 12 is connected to the horizontal rod portion 111 by means of inserting two of the bolts 15 through the central holes 152 of those of the ringed pads 15 that are arranged next to the axle 12, and the corresponding through holes 122 of the axle 12 as well as by means of inserting two other bolts 15 through the central holes 152 of the other ringed pads 15, and the corresponding through holes 112 of the horizontal rod portion 111. And finally, the bolts 16 are each tightly screwed into a nut 161 at a tail end, which nut 161 is formed such as not to become loose easily. Because the length of the insertion portions 151 is larger than the width of the connecting plates 14, the connecting plates 14 still can pivot on the bolts 16 even if the ringed pads 15 are tightly pressed against the axle middle portion and the horizontal rod portion 111 by the bolts 16 and the nuts 161. In the first embodiment, connecting plates 14 of same sides are arranged such as to normally form a substantially V shape, as shown in FIGS. 2 and 4, while in the first embodiment, connecting plates 14 of same sides are arranged such as to normally form a substantially inverted V shape, as shown in FIG. 8; thus, the axle 12 will not tilt normally, and in turns, the electric cart can move along smoothly.

Figure 7:
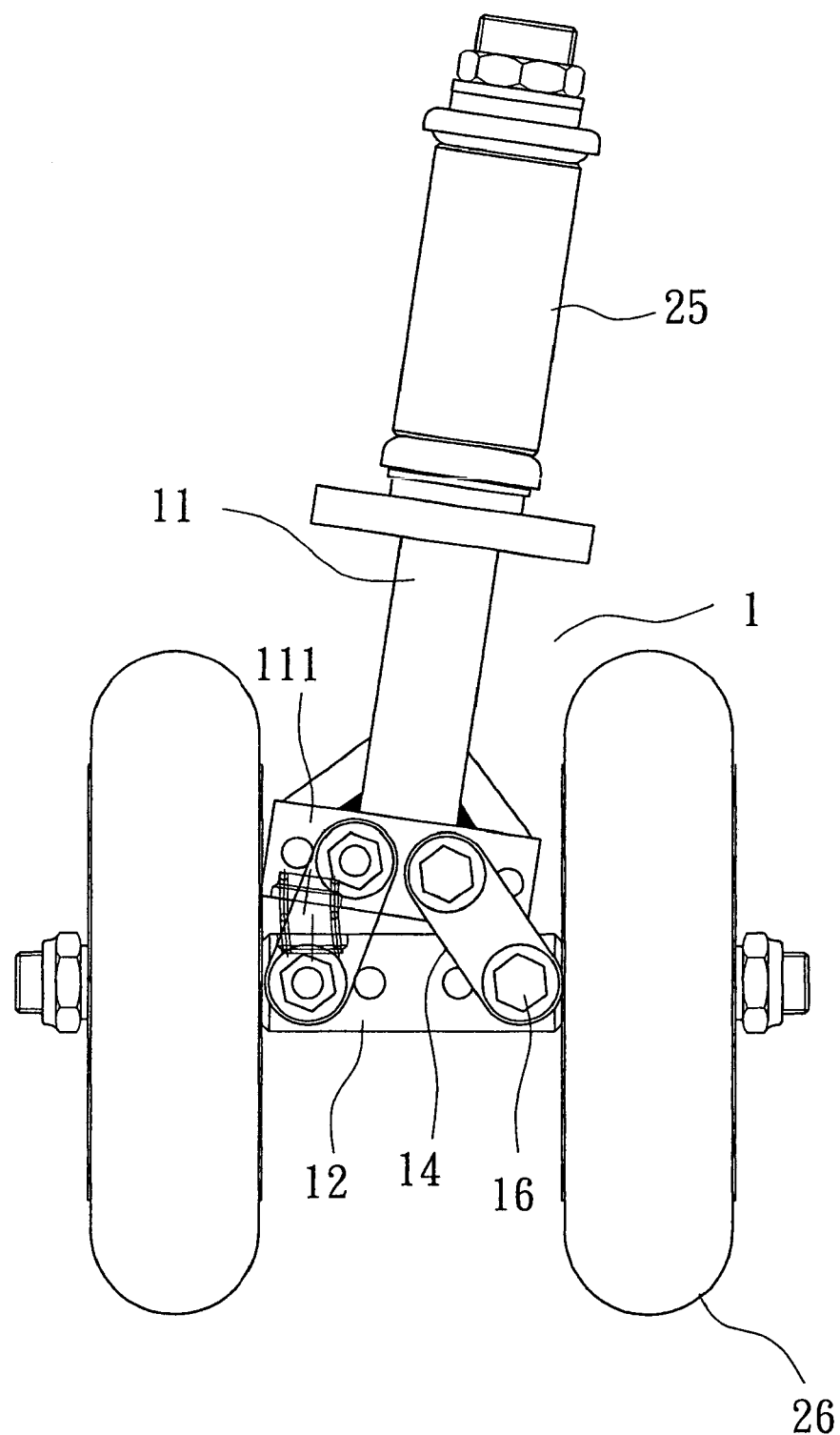
FIG. 7 is a partial front view of the electric cart of the present invention when the shock absorbing structure is functioning.

Referring to FIG. 7, when the electric cart moves along, and turns or hit other objects at one of the front wheels 26, the orientation of the axle 12 relative to the control shaft 11 will be changed accordingly, and in turns, the axle 12 and the control shaft 11 will tilt, and cause the elastic elements 13 to change shape and length. Consequently, the elastic elements 13 will counteract the displacement of the axle 12 and the control shaft 11 relative to each other, reducing the shock caused when the electric cart turns or hit other objects, and preventing the cart from tilting too much to fall over.

From the above description, it can be easily understood that the present turning mechanism of an electric cart has simpler structure than that of a conventional four-wheel electric cart made according to Ackeman Principle, and in turns, the manufacturing cost is lower. In other words, the present electric cart is not only convenient to use like a three-wheel one but also as stable as a four-wheel electric one, eliminating the disadvantage of a single front wheel of a cart, easiness to skid. And, the twin front wheels 26 will move back to the original position automatically after a turn of the cart.

What is claimed is:

1. A shock absorbing structure of a turning mechanism of an electric cart equipped with twin front wheels, comprising a control shaft, the control shaft having a horizontal rod portion at a lower end thereof; the horizontal rod portion being formed with a plurality of through holes extending from a front side to a rear side thereof, and hollows on a lower side thereof;

an axle, the axle being formed with a plurality of through holes extending from a front side to a rear side thereof, and hollows on an upper side thereof; the axle being connected to front wheels at two ends thereof;

a plurality of elastic elements disposed between the lower side of the horizontal rod portion and the upper side of the axle, each elastic element being inserted in one of the hollows of the horizontal rod portion at an upper end, and a corresponding hollow of the axle at a lower end;

a plurality of connecting plates arranged next to front and rear sides of the horizontal rod portion and the axle; each of the connecting plates having two fitting holes respectively opposing a selected one of the through holes of the horizontal rod portion, and a selected one of the through holes of the axle;

a plurality of ringed pads each having a pad portion, an insertion portion having a smaller diameter than the pad portion, and a central hole extending through the pad portion and the insertion portion; the ringed pads being inserted in respective fitting holes of the connecting plates at the insertion portions thereof; length of the insertion portions being at least slightly larger than thickness the connecting plates; and a plurality of bolts inserted through the ringed pads on the front sides, the through holes, and the ringed pads on the rear sides in sequence, and screwed into nuts at tail ends.

2. The shock absorbing structure of a turning mechanism of an electric cart equipped with twin front wheels as claimed in claim 1, wherein the ringed pads are made of self-lubricating materials.

3. The shock absorbing structure of a turning mechanism of an electric cart equipped with twin front wheels as claimed in claim 1, wherein the connecting plates are arranged such as to form a substantially V shape.

4. The shock absorbing structure of a turning mechanism of an electric cart equipped with twin front wheels as claimed in claim 1, wherein the connecting plates are arranged such as to form a substantially inverted V shape.

* * * * *